Figure 1:
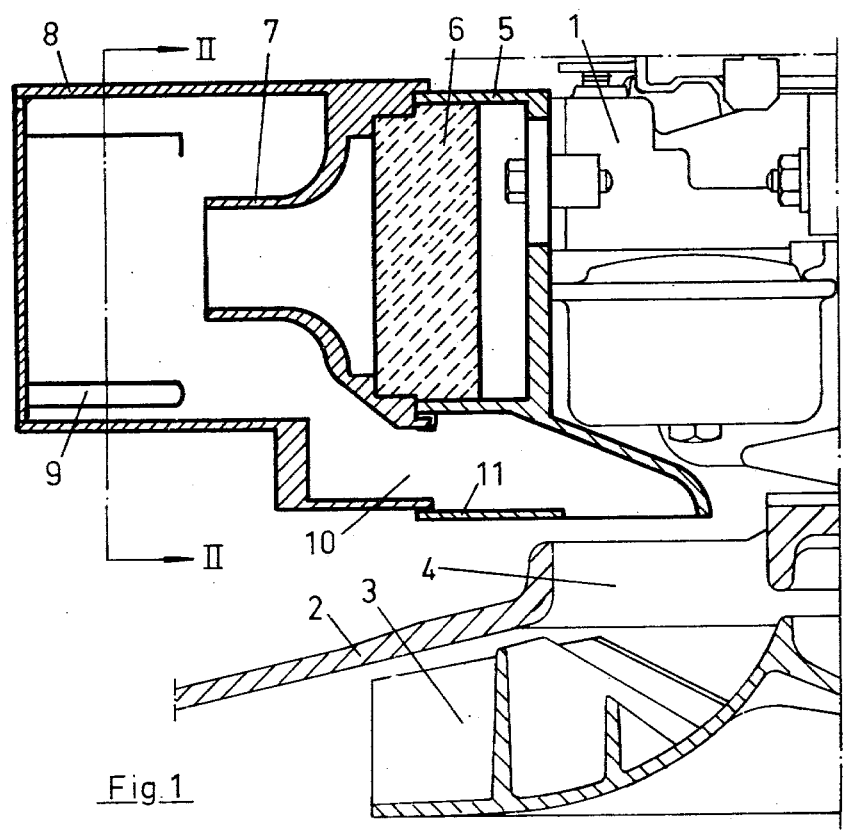

United States Patent [19]

Lindman

[11] 4,276,067

[45] Jun. 30, 1981

[54] INDUCTION AIR CLEANER FOR A LAWN MOWER ENGINE

[75] Inventor: Karl A. Lindman, Oxie, Sweden

[73] Assignee: Flymo Societe Anonyme, Zug, Switzerland

[21] Appl. No.: 784,815

[22] Filed: Apr. 5, 1977

Related U.S. Application Data

[63] Continuation of Ser. No. 628,601, Nov. 4, 1975, abandoned.

[30] Foreign Application Priority Data

Nov. 9, 1974 [GB] United Kingdom ............... 48575/74

[51] Int. Cl.³ .......................................... B01D 50/00
[52] U.S. Cl. ................................. 55/337; 55/385 B; 55/391; 55/419; 55/431; 55/439; 55/450; 55/459 R; 55/DIG. 28; 56/13.4; 56/DIG. 3; 180/19 R; 180/116

[58] Field of Search ................... 55/337, 391, 385 B, 55/385 R, 419, 431, 439, 450, 459 R, DIG. 28; 56/13.4, DIG. 3; 180/116, 19 R

[56] References Cited

U.S. PATENT DOCUMENTS

| | | | |
|---|---|---|---|
| 2,953,216 | 9/1960 | Hight et al. | 55/385 B X |
| 3,003,300 | 10/1961 | Jepson | 180/19 R X |
| 3,077,716 | 2/1963 | Wilson | 55/337 |
| 3,137,553 | 6/1964 | Billey | 55/431 |
| 3,354,621 | 11/1967 | Wilson | 55/337 |
| 3,423,912 | 1/1969 | Heth | 180/116 X |
| 3,838,675 | 10/1974 | Schaeffer | 55/337 X |
| 3,925,044 | 12/1975 | Tu et al. | 55/419 X |

Primary Examiner—Kathleen J. Prunner
Attorney, Agent, or Firm—Laurence R. Brown

[57] ABSTRACT

A carburetor air cleaner for an air cushion supported lawn mover provides a cyclone dust separator with carburetor air input from the vortex. The air is drawn through the separator by suction from the lawn mower air impeller which produces the air cushion.

2 Claims, 2 Drawing Figures

INDUCTION AIR CLEANER FOR A LAWN MOWER ENGINE

This is a continuation, of application Ser. No. 628,601, filed Nov. 4, 1975, now abandoned.

This invention relates to a device for cleaning induction air for a combustion engine used as a power source in a lawn mower of the kind which is supported by means of an air cushion when in operation.

It is a general experience that conventional air filters in combustion engines used in lawn mowers may rapidly become clogged if the mowers are used in dry and dusty surroundings. Therefore, it has been common practice to use a so-called "schnorkel" device—i.e. a hose connecting the carburettor housing air inlet with an air intake opening located at the top of the handle of the lawn mower. Thus the induction air for the combustion may be supplied from a location in which the air generally is much less polluted with dust as compared with the air in the vicinity of the carburettor.

It has previously been proposed to clean induction air for the engine of a lawn mower of the kind referred to by using an air duct leading induction air for the engine away from a flow of air used for creating the air cushion support. The induction air is withdrawn from the flow of supporting air at a sharp flow bend, thus avoiding particles which by inertia will remain in the greater flow of supporting air. This measure, however, is often inadequate, so that it has been preferred to use the "schnorkel" devices.

The present invention has for its object to provide a device for adequate cleaning of induction air for the engine of a mower of the kind referred to whilst avoiding the use of a hose.

According to the present invention there is provided a device for cleaning induction air for a combustion engine used as a power source in a lawn mower of the kind which is supported by means of a cushion of air when in operation, comprising a cylindrical chamber having a plurality of tangential air inlet openings, an induction tube extending co-axially into said chamber, and a filter element, said chamber having an outlet opening remote from said inlet openings and from the entrance to said induction tube, said outlet opening being in communication through ducting with a position adjacent to an air inlet port in a housing of the mower, whereby when the mower is in operation air enters through said tangential air inlet openings and makes a rotary motion within said chamber so that the air is partially cleaned as in a cyclone separator, a portion of the partially cleaned air passes through the induction tube and the filter element to the engine, and particle-laden air passes from the chamber through the said outlet opening and ducting and inlet port to the air cushion.

Figure 2:
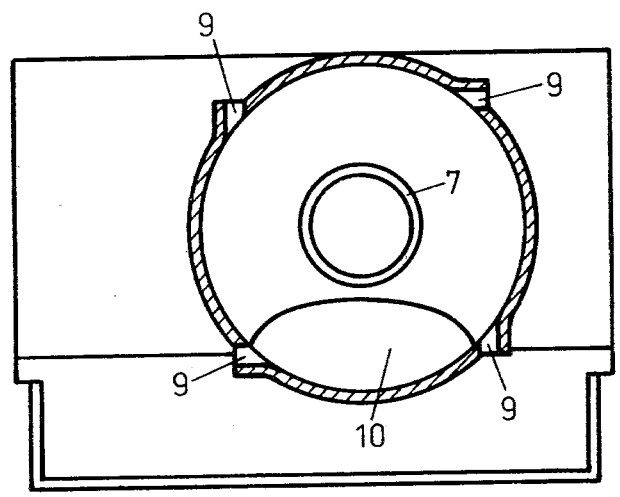

How the invention may be put into practice is described in more detail with reference to the accompanying drawing, in which FIG. 1 shows a device according to the invention in partial vertical section, and FIG. 2 shows a view in section along the line II—II of FIG. 1.

The drawing shows a carburettor housing 1 of an internal combustion engine used as a power source for a lawn mower of the kind referred to and mounted (through means not shown) on a mower housing 2. The lawn mower being of the kind referred to, the housing 2 contains an air impeller 3 for sucking air through air inlet ports 4 located at the top of the housing 2, only one of said inlet ports being shown in FIG. 1.

The carburettor housing 1 carries a filter housing 5 for retaining a porous filter element 6. A further housing comprising an induction tube 7 engages the filter element 6 and is connected to the filter housing 5, the induction tube 7 extending co-axially into a cylindrical chamber 8 formed within a wall of said further housing. As FIG. 1 shows, the induction tube 7 diverges from its entrance to the filter element 6. The cylindrical chamber 8 is provided with four tangential air inlet openings 9.

The said further housing enclosing the chamber 8 has an outlet opening 10 located remote from the inlet openings 9 and from the entrance to the induction tube 7. The filter housing 5 is provided integrally with ducting 11 for establishing communication between the outlet opening 10 and a position adjacent to the illustrated air inlet port 4.

The device as illustrated and described will operate as follows:

During the running of the engine the impeller wheel 3 will cause a substantial flow of air downwards through the inlet port 4. A great portion of said air flow will be sucked through the outlet opening 10, said portion entering the chamber 8 through the inlet openings 9.

Induction air for combustion in the engine will be sucked through the induction tube 7, the filter element 6, and the filter housing 5 into the carburettor housing 1. This induction air is much smaller in amount than the amount of particle-laden air passing the outlet opening 10 during the same time interval. All the air entering the chamber 8 will be sucked via the openings 9 into the chamber 8. Due to the tangential direction of the inlets 9, the air in the chamber 8 will form a vortex and become partially cleaned as in a cyclone separator, the vortex containing cleaner air in its central portions and more dust particles in its outer portions. Cleaner air will thus be withdrawn into the induction tube 7 and the engine, whilst most of the particles will pass with the flow of air to the impeller 3.

Tests have indicated that a device according to the invention may, under severe conditions, permit extensions of the intervals between cleaning of the filter element 6 more than five times compared with such intervals under similar working conditions using air cleaner means of earlier designs. This improvement has in many cases made it possible to dispense with "schnorkel" devices, which are more expensive.

By removing the housing comprising the induction tube 7 and the wall around the chamber 8 the filter element 6 becomes readily accessible for periodically cleaning and coating with oil, which is normal practice with many engines used on lawn mowers.

What is claimed is:

1. The combination comprising, a lawn mower housing including thereunder a rotatable air impeller for producing an air cushion supporting the lawn mower housing during operation,
   a combustion engine mounted to rotate said impeller,
   a carburettor disposed on said engine having an opening for receiving air,
   an air inlet port in said housing through which said impeller sucks air downwardly for said air cushion,
   a filter housing connected to said carburettor to pass air into said opening, a porous filter element in said filter housing through which air flows to said carburettor through said opening, a further housing comprising a closed end cylindrical chamber having elongated tangential air inlet openings therein adjacent the closed end and an induction tube extending coaxially therein, structure on said further housing engaging the filter housing to direct air thereto through said induction tube, means disposed to receive air flow outside the coaxial position of said induction tube defining an air flow path from said tangential openings in said further housing to said inlet port thereby causing said impeller to suck air into said tangential air inlet openings causing air flowing through said further housing to define a cyclone action with a central vortex about the cylindrical chamber axis, and said induction tube defining a single air inlet path to said carburettor opening positioned coaxially within said further housing thereby receiving a smaller amount of the air introduced into said tangential openings only from the cleaner air at the central portions of said vortex, whereby air is received from the elongated tangential air inlet openings for passage of a smaller portion of the air having dirt removed therefrom by cyclone action to said induction tube with the remainder and at least a substantial portion of the dirt therewith passing to said air inlet port in the lawn mower housing.

2. A device as defined in claim 1 wherein said induction tube presents an entrance and has diverging dimensions between said entrance and said filter.

* * * * *